(12) United States Patent
Wang

(10) Patent No.: US 8,319,124 B1
(45) Date of Patent: Nov. 27, 2012

(54) LIQUID ACTIVATED SWITCH APPARATUS

(76) Inventor: Neil Shumeng Wang, San Diego, CA (US)

( * ) Notice: Subject to any disclaimer, the term of this patent is extended or adjusted under 35 U.S.C. 154(b) by 317 days.

(21) Appl. No.: 12/803,419

(22) Filed: Jun. 28, 2010

(51) Int. Cl.
*H01H 35/18* (2006.01)

(52) U.S. Cl. ...................................................... 200/84 R

(58) Field of Classification Search ....... 200/84 R–84 C, 200/61.2, 81.4, 81 R; 73/308, 313
See application file for complete search history.

(56) References Cited

U.S. PATENT DOCUMENTS

| | | | | |
|---|---|---|---|---|
| 3,409,750 A | * | 11/1968 | Hathaway | 200/84 R |
| 3,872,429 A | * | 3/1975 | Arney | 340/450.3 |
| 4,001,531 A | * | 1/1977 | Crockett, Sr. | 200/61.04 |
| 4,473,730 A | * | 9/1984 | Ida | 200/84 R |

\* cited by examiner

*Primary Examiner* — Edwin A. Leon

(57) ABSTRACT

A liquid activated switch apparatus that is adapted to be connected to at least on electric circuit can be used to turn on and off said electric circuit based on the amount of liquid accumulated in the apparatus. The apparatus includes a container adapted to receive liquid such as water or rain. Inside the container, there are two electrically conductive members with the first member attached to the container and the second member to a floating body. The floating body is designed and configured such that the floating body will start floating once liquid accumulated inside the container reaches certain predetermined level or a threshold. The floating body will float and rise along with the rising liquid level beyond the threshold thus displacing the second electrically conductive member that is attached to it causing two electrically conductive members to change connectivity; from electrically connected to disconnected or vice versa. When liquid level recedes below the threshold, the connectivity of two electrically conductive members will revert to their original position.

6 Claims, 3 Drawing Sheets

LIQUID ACTIVATED SWITCH APPARATUS

BACKGROUND

Automatic sprinkler systems are widely used for residential and commercial properties to control sprinkler heads when and for how long one or more watering stations should be turned on.

To conserve water, it is desirable to turn a sprinkler system off altogether when there is sufficient amount of rain. After rain has stopped and enough rain water evaporated, the sprinkler system should go back to its normal programmed mode so that plantation that is covered by sprinklers does not dry out and wither.

Manually turning off the sprinkler systems when there is rain and turning them back on a day or a few days after the rain will work in principle. However, remembering to turn off and on the sprinkler system can be a challenge. Forgetting to turn off a sprinkler system after rain will waste water, but forgetting to turn the sprinkler system back on a few days after the rain can potentially ruin a garden, thus deterring people from trying this water conservation activity.

There are primarily three types of rain shut off sprinkler systems on the market. One is weight based, another is conductivity based and the other is volume based.

For the weight based system, a container with an open top collects rain water and. Once the water inside the container reaches certain predetermined weight, the weigh of the container will push down far enough on an electrical switch that is mechanically attached to the container bottom to turn off the switch which in turn cuts off electricity to the sprinkler heads. The problem with this system is that the container will not just collect rain water, it will also catch falling objects such as leaves. A sprinkler system that is turned off not because of rain water but because of falling leaves can potentially ruin a backyard or flower beds. As such, the system is not very reliable.

For the conductivity based system, a container with an open top has two electrically conductive members are positioned apart inside the container. Conductivity between the electrically conductive members is constantly measured, and will change based on whether there air between two electrically conductive members or water. Changing in conductivity due to presence of water or air will turn off or on power to the sprinkler heads. The problem with this system is that the consistency of conductivity of water. When there is impurity in the water (e.g. dust, bird dropping, etc), conductivity changes which may alter the on/off function yielding an unreliable rain shut-off switch that can potentially ruin a garden.

For the volume based system, an electrical switch is situated in proximity of a block of material whose volume can expand once moisture is absorbed. Among many materials found in daily lives, cork is one such material that can easily expand when it absorbs water. The expandable material and the switch are placed inside an open top container. The cork will start expanding once the container receives rain water. After it expands to a predetermined size, the electrical switch is activated by the expanding material to turn off the sprinkler heads. The problem is that expandable materials typically have a life: after so many dry-wet cycles, their expandability with relation to the amount of water may change causing reliability issues.

To summarize, there is a need for a liquid or water activated electrical switch or a rain shut off system to automatically and reliably detect there is enough rain fall to turn off a sprinkler system and to automatically detect there is sufficient water evaporation to turn the sprinkler system back on.

SUMMARY

Described below is a switch apparatus and method designed to turn at least one electric circuit on and off. More particularly, the switch apparatus and the method may be used to turn on or off at least one electric circuit based on amount of liquid accumulated or liquid level inside the apparatus.

One form of the system described below is a switch apparatus that will switch from a closed or connected position to an open or disconnected position when liquid level reaches a certain level or a threshold, and return to the original closed or connected position when liquid level recedes below the threshold.

The apparatus has a container with a portion of it such as the top cover having at least one opening to receive falling liquid or water or falling rain and the container can collect liquid that passes through the opening. Inside the container, there are two electrically conductive members. The first member is attached to the container at or near the bottom facing and pointing substantially upwards. There is a floating body adapted to freely move up and down along with the rise and fall of liquid level inside the container and to rest towards the bottom of the container in the absence of liquid inside the container. The second electrically conductive member is attached to the floating body, preferably near or at the bottom directly facing the first member and is adapted to come into direct contact with the first electrically conductive member when the floating body rests directly on top of the first member. In the absence of liquid inside the container, the floating body rests near or at the bottom of the container forcing the second member to be in physical and therefore electrical contact with the first member forming an electrical connection or causing the switch apparatus to be in a closed or on position.

Further, the floating body is configured and designed such that it will start afloat when liquid level inside the container reaches a certain predetermined threshold. The design considerations for the floating body and when the floating body will start afloat include type of liquid, size, shape, and material of the floating body.

When liquid starts to come through the opening of and into the container, liquid will accumulate inside the container. The floating body will remain rested towards the bottom of the container un-displaced from its original position keeping two electrically conductive members connected and the switch apparatus in its closed position as long as the liquid level stays below the threshold. As the liquid level rises further, the floating body starts floating and rising along with the rising liquid level. Upward displacement of the floating body pulls the second electrically conductive member away from the first electrically conductive member and eventually causes the second electrically conductive member to disengage from the first electrically conductive member and therefore to break the connection between the first and second electrically conductive members thus turning a switch from a closed or connected position to an open or disconnected position.

In a reverse order, the position of the floating body will come down as the liquid level inside the container recedes, such as through evaporation. Falling liquid level will cause the floating body to fall and eventually forces the second electrically conductive member to come into direct contact with the first member when the liquid level falls below the threshold thus turning the switch from an open or disconnected position back to the original closed or connected position.

In the second embodiment, a switch apparatus will switch from an open or disconnected position to a closed or connected position when liquid level reaches a certain level or a threshold, and return to the original open or disconnected position when liquid level recedes below the threshold.

The apparatus has a container with a portion of it such as the top cover having at least one opening to receive falling liquid or water or falling rain and the container can collect liquid that passes through the opening. Inside the container, there are two electrically conductive members. The first electrically conductive member is attached to the container near the top, substantially away from the bottom of the container facing and pointing substantially down towards the bottom of the container. There is a floating body adapted to freely move up and down inside the container along with the rise and fall of liquid level and to rest towards the bottom of the container in the absence of liquid inside the container. The second electrically conductive member is attached to the floating body, preferably near or at the top of the floating body preferably facing the first electrically conductive member and is adapted to come into direct contact with the first electrically conductive member when the floating body rises to push the second member directly against the first electrically conductive member. In the absence of liquid inside the container, the floating body rests near or at the bottom of the container physically separating the first member from the second member causing the switch apparatus to be in an open or disconnected position.

Further, the floating body is configured and designed such that it will start afloat when liquid level inside the container reaches a certain predetermined threshold. The design considerations for the floating body and when the floating body will start afloat include type of liquid, size, shape, and material of the floating body.

When liquid starts to come through the opening of and into the container, liquid will start accumulating inside the container. The floating body will remain rested towards the bottom of the container un-displaced from its original position keeping two electrically conductive members disconnected and the switch apparatus in its open position as long as the liquid level stays below the threshold. As the liquid level rises further, the floating body starts floating and rising along with the rising liquid level. Upward displacement of the floating body brings the second electrically conductive member closer to the first electrically conductive member and eventually forces the first and second electrically conductive members to come into direct contact thus turning a switch from an open or disconnected position to a closed or connected position.

In a reverse order, the level of the floating body will come down as the liquid level inside the container recedes, such as through evaporation and eventually forcing the second electrically conductive member to come apart from the first member when the liquid level falls below the threshold thus turning the switch from a closed or connected position back to the original open or disconnected position.

Other features and advantages will become apparent from the description and claims that follow.

BRIEF DESCRIPTION OF THE DRAWINGS

The invention is described in greater detail hereinafter by reference to the accompanying drawings wherein.

DETAILED DESCRIPTION

This invention provides a system that actuates an on/off switch based on current liquid or water level with relation to a preset threshold. The system has a container with an area that has at least one opening through which fluid or water can come through to be accumulated inside the container. When liquid level inside the container reaches a predetermined level or a threshold, an electrical switch is triggered (from a closed to an open position or from an open to a closed position). This system can be connected to at least one electrical circuit or other system such as a sprinkler system in such a way that the circuit or sprinkler heads can be turned on or off based on liquid or water lever collected inside the container. Assuming a switch used in this system is in an open (or closed) position when there no liquid inside the container, the switch will remain open (or closed) as long as the liquid level inside the container is below the threshold. Once the liquid level reaches and passes beyond the threshold, the switch changes connectivity; from open to closed or from closed to open. When liquid level recedes and drops below the threshold, the electrical switch will be reversed to its original position.

Figure 1:
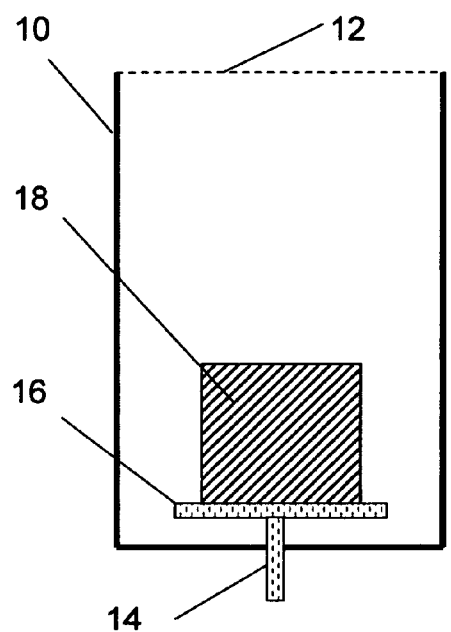
FIG. 1 is a schematic diagram of the first embodiment of a liquid activated switch apparatus showing a floating body resting at the bottom of a container and two electrically conductive members in a connected or closed position in the absence of liquid inside the container.
Figure 4:
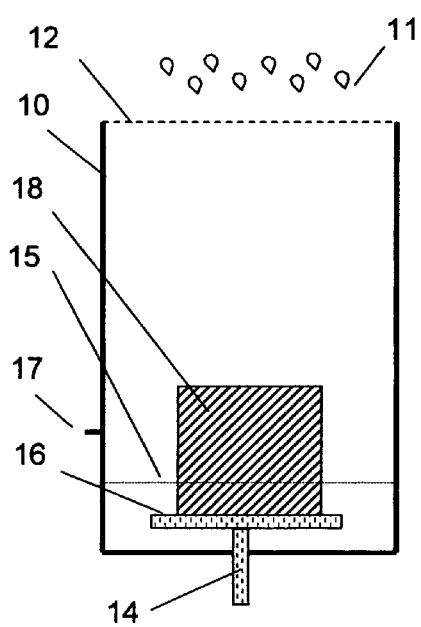
FIG. 4 is a schematic diagram of the first embodiment of a liquid activated switch apparatus illustrating liquid falling from top of the container and rising liquid level inside the container while the switch is still in a closed or connected position.

Referring to FIG. 1 the apparatus there illustrated comprises a container 10 and a top or a cover 12 of container 10 has at least one opening to receive falling liquid, such as rain. As FIG. 4 illustrates, when there is falling liquid 11, such as falling rain coming through the opening of container top 12, liquid will accumulate inside container 10 with a level indicated by 15.

A first electrically conductive member 14 is attached to container 10 and positioned at or substantially near the bottom of container 10 facing and pointing substantially towards the top of container 10.

There is a floating body 18 adapted to freely move up and down inside container 10 along with the rise and fall of liquid level 15 and to rest freely towards the bottom of container 10 in the absence of liquid inside container 10.

A second electrically conductive member 16 is attached to, preferably near or at the bottom of floating body 18 facing towards first member 14 and is adapted to come into direct contact with first member 14 when floating body 18 rests freely towards the bottom of container 10 in the absence of liquid. In the absence of liquid inside container 10, floating body 18 rests near the bottom of container 10 forcing second electrically conductive member 16 to be in direct physical and therefore electrical contact with first electrically conductive member 14 forming a closed circuit or causing a switch to be in a closed position.

Figure 2:
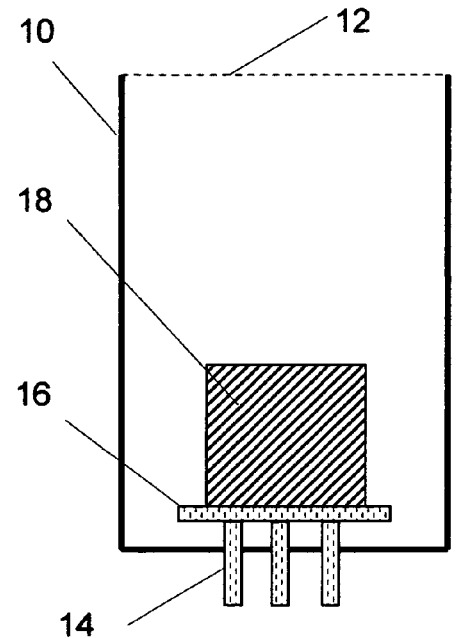
FIG. 2 is a schematic diagram of the first embodiment of a liquid activated switch apparatus similar to that in FIG. 1 with the first member having three contact points.
Figure 3:
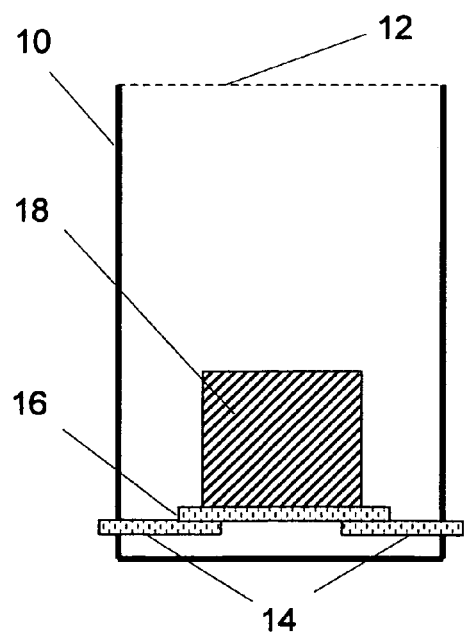
FIG. 3 is a schematic diagram of the first embodiment of a liquid activated switch apparatus similar to that in FIG. 1 with the first member having two contact points.

While FIG. 1 illustrated a single, pointed first electrically conductive member 14 and a single, flat second electrically conductive member 16, both electrically conductive members 14 and 16 can take different shapes and forms. FIG. 2 and FIG. 3 illustrate that first electrically conductive member 14a and 14b can come in different shape, size and number of contact points while other components remain the same as FIG. 1.

Inside container 10, there is a predetermined threshold 17. Floating body 18 is configured and designed such that it will start afloat when liquid level 15 reaches threshold 17. The design considerations for floating body 18 and when floating body 18 will start afloat include type of liquid, size, shape, and material of floating body 18.

Figure 5:
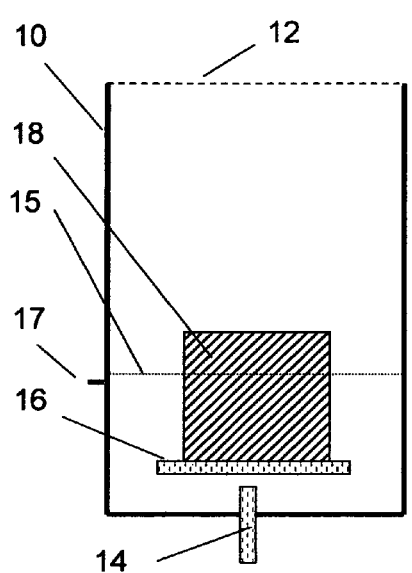
FIG. 5 is a schematic diagram of the first embodiment of a liquid activated switch showing two electrically conductive members in a disconnected or open position with the liquid level past beyond the threshold.

As FIG. 5 illustrates, once liquid level 15, an indication of liquid accumulated inside container 10, reaches threshold 17, floating body 18 will start floating. As floating body 18 is displaced upward by buoyant force of liquid, second electrically conductive member 16 is pushed upwards and pulled away from first electrically conductive member 14. Eventually, second electrically conductive member 16 will physically and electrically disengage from first electrically conductive member 14 thus breaking a formally closed circuit between two electrically conductive members 14 and 16. The switch formed by first electrically conductive member 14 and second electrically conductive member 16 is therefore turned from a closed position to an open position.

Liquid level 15 inside the container 10 will recede through some mechanisms such as evaporation through openings in container top 12 into atmosphere. Floating body 18 will fall along with receding liquid level 15. As soon as liquid level 15 drops below threshold 17, downward displacement of floating body 18 will force second electrically conductive member 16 to physically and eclectically engage first electrically conductive member 14 thus making an electrical contact between two electrically conductive members 14 and 16 and turning the switch on or into a closed position again.

Figure 6:
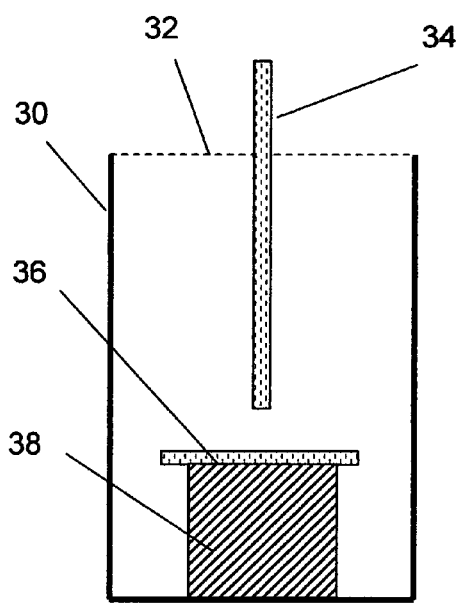
FIG. 6 is a schematic diagram of the second embodiment showing two electrically conductive members in a disconnected or open position in the absence of liquid inside the container.
Figure 7:
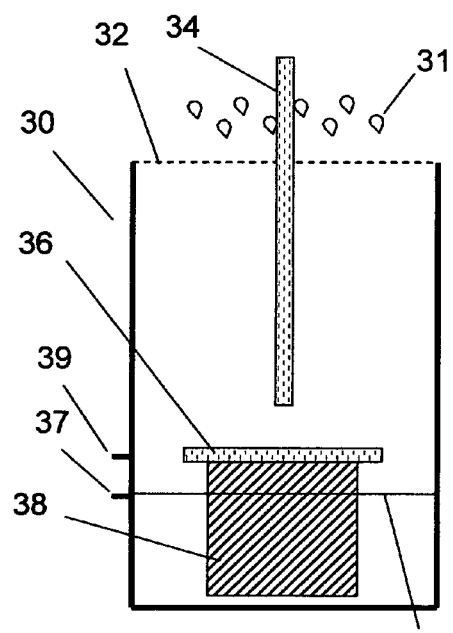
FIG. 7 is a schematic diagram of the second embodiment showing liquid falling from top of the container and rising liquid level inside the container while the switch is still in an open or disconnected position.
Figure 8:
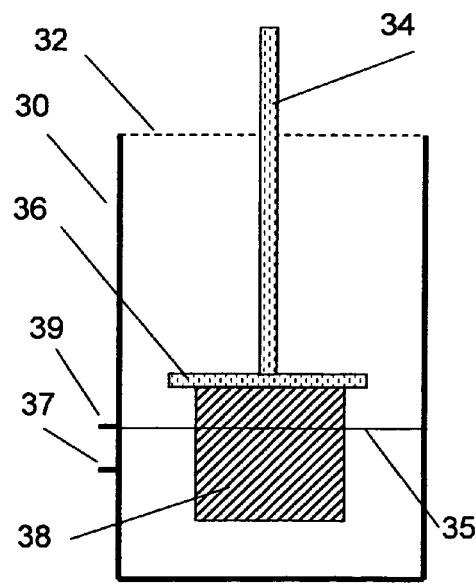
FIG. 8 is a schematic diagram of the second embodiment showing the floating body afloat in the liquid and two electrically conductive members in a connected or closed position with the liquid level reaching the second threshold.

FIGS. 6, 7 and 8 illustrate a second embodiment of a liquid or water activated switch. In this embodiment, there is a container 30 and a top or a cover 32 which has at least one opening to receive falling liquid or water, such as rain. As FIG. 7 illustrates, when there is liquid falling such as rain fall 31 on to container 30, liquid will pass through container top 32 and accumulate inside container 30 with a liquid level indicated by 35.

A first electrically conductive member 34 is attached to container 30 and situated substantially above the bottom of container 30 pointing and facing substantially downward towards the bottom of container 30.

There is a floating body 38 adapted to freely move up and down inside container 30 along with the rise and fall of liquid level 35 and to rest towards the bottom of container 30 in the absence of liquid.

A second electrically conductive member 36 is attached preferably to the top of floating body 38 facing generally upward towards first electrically conductive member 34. In a free standing position, floating body 38 rests near the bottom of container 30 with second electrically conductive member 36 disengaged from first electrically conductive member 34 thus forming an open circuit or a switch in an open position.

Inside container 30, there is a first predetermined threshold 37 and a second predetermined threshold 39 which is higher than first threshold 37. The floating body 38 has its volume and weight designed and configured in such a way that the combination of floating body 38 and second electrically conductive member 36 will start floating once liquid level 35 reaches first threshold 37. The design considerations for floating body 38 and when floating body 38 will start afloat include type of liquid, size, shape, and material of the floating body 38.

As FIG. 8 illustrates, once liquid level 35 rises past first threshold 37, floating body 38 will continue to rise along with rising liquid level 35. Upward displacement of floating body 38 brings second electrically conductive member 36 closer to first electrically conductive member 34. After liquid level 35 reaches second threshold 39, second electrically conductive member 36 is pushed upwards against first electrically conductive member 34 to physically and therefore electrically engage with first electrically conductive member 34 thus forming a closed circuit or turning the switch from an off position to an on position. Here, first threshold 37 and second threshold 39 can be two separate thresholds or can merge as one depending on how the design of switching response time is to liquid level 35. When two thresholds 37 and 39 converge, first electrically conductive member 34 and second electrically conductive member 36 become electrically engaged once liquid level 35 reaches the threshold 37 (equivalent to the threshold 39). On the other hand, two different thresholds 37 and 39 allow switching delay between time required for liquid level 35 to go from first threshold 37 to second threshold 39 that some applications may require.

Liquid level 35 inside the container 30 will recede through some mechanisms such as evaporation through openings in container top 32 into atmosphere. Floating body 38 will fall along with receding liquid level 35. As soon as liquid level 35 drops below second threshold 39, downward displacement of floating body 38 will force second electrically conductive member 36 to physically and eclectically disengage first electrically conductive member 34 thus breaking an electrical contact between two electrically conductive members 34 and 36 and turning the switch off or into an open position again.

While the invention and exemplary embodiments of the invention have been illustrated and described in general and specific terms, it should be understood that the invention may be modified and otherwise embodied in still other forms, including but not limited to all forms which are obvious variants of or equivalent to those disclosed.

The preceding descriptions are by way of example and are not intended to limit or restrict the scope of the invention which is specified and defined by the appended claims.

I claim:

1. An electric switch apparatus used in turning off and on at least one electrical circuit connected to said switch based on water level inside the apparatus from falling rain, the electric switch apparatus comprising:
    a container having a top cover with at least one opening receiving falling rain and an interior collecting said falling rain with a water level indicating amount of water collected inside said container;
    a first electrically conductive member;
    means to attach said first electrically conductive member to said container;
    a second electrically conductive member positioned above and facing said first electrically conductive member and making direct physical contact with said first electrically conductive member to form an electrical connection when said second electrically conductive member comes down on said first electrically conductive member from above;

a floating body placed inside said container and floating in said water and to rise and fall freely along with the rise and fall of said water level inside said interior of said container;

means to attach said second electrically conductive member to said floating body such that said second electrically conductive member and said floating body move together;

said floating body resting freely inside said container in absence of said water causing said second electrically conductive member to fall on top of said first electrically conductive member to physically and electrically engage said first electrically conductive member to form an electrical connection between said first electrically conductive member and said second electrically conductive member to turn on said electrical circuit; and said first electrically conductive member and said second electrically conductive member being physically and electrically disengaged and disconnected to turn off said electrical circuit when said floating body is afloat in the presence of said water inside said container.

2. The apparatus of claim 1, wherein said first electrically conductive member is attached said container and positioned substantially to the bottom of said container facing generally upwards and said second electrically conductive member is attached substantially to the bottom of said floating body facing generally towards said first electrically conductive member.

3. The apparatus of claim 1, wherein there is a water level threshold, said floating body is configured such that the buoyant force exerted by said water on said floating body is equal to combined weight of said second electrically conductive member and said floating body only when said water level inside said container reaches said threshold and said floating body starts afloat when said water level inside said container reaches at least said threshold.

4. An electric switch apparatus used in turning off and on at least one electrical circuit connected to said system based on water level accumulated inside the apparatus from falling rain comprising:

a container having a cover with at least one opening receiving falling rain and an interior collecting said falling rain with a water level indicating amount of water collected inside said container;

a first electrically conductive member;

means to attach said first electrically conductive member to said container;

a second electrically conductive member positioned below and facing said first electrically conductive member and making direct physical contact with said first electrically conductive member to form an electrical connection when said second electrically conductive member is pushed upwards against said first electrically conductive member from underneath;

a floating body placed inside said container and floating in said water and to rise and fall freely along with the rise and fall of said water level inside said interior of said container;

means to attach said second electrically conductive member to said floating body such that said second electrically conductive member and said floating body move together;

said floating body resting freely inside said container in absence of said water causing said second electrically conductive member to disengage physically and electrically from said first electrically conductive member thus causing said first electrically conductive member and said second electrically conductive member to be electrically disconnected to turn off said electrical circuit; and said first electrically conductive member and said second electrically conductive member forming an electrical connection when said floating body is afloat in the presence of said water inside said container to cause said second electrically conductive member to be pushed upwards against said first electrically conductive member and to physically and electrically engage said first electrically conductive member.

5. The apparatus of claim 4, where said first electrically conductive member is attached to said container and positioned substantially to the top of said container facing generally downward and said second electrically conductive member is attached generally to the top of said floating body facing generally toward said first electrically conductive member.

6. The system of claim 4, wherein there is a first water level threshold, said floating body is configured such that the buoyant force exerted by said water on said floating body is equal to the combined weight of said second electrically conductive member and said floating body only when said water level inside said container reaches said first threshold and said floating body starts afloat when water level inside said container reaches at least said first threshold.

* * * * *